June 10, 1958  M. WIBAULT  2,838,257
JET SUSTAINED AIRCRAFT WITH ENCLOSED
COMPRESSOR ROTOR
Filed July 27, 1954  3 Sheets-Sheet 1
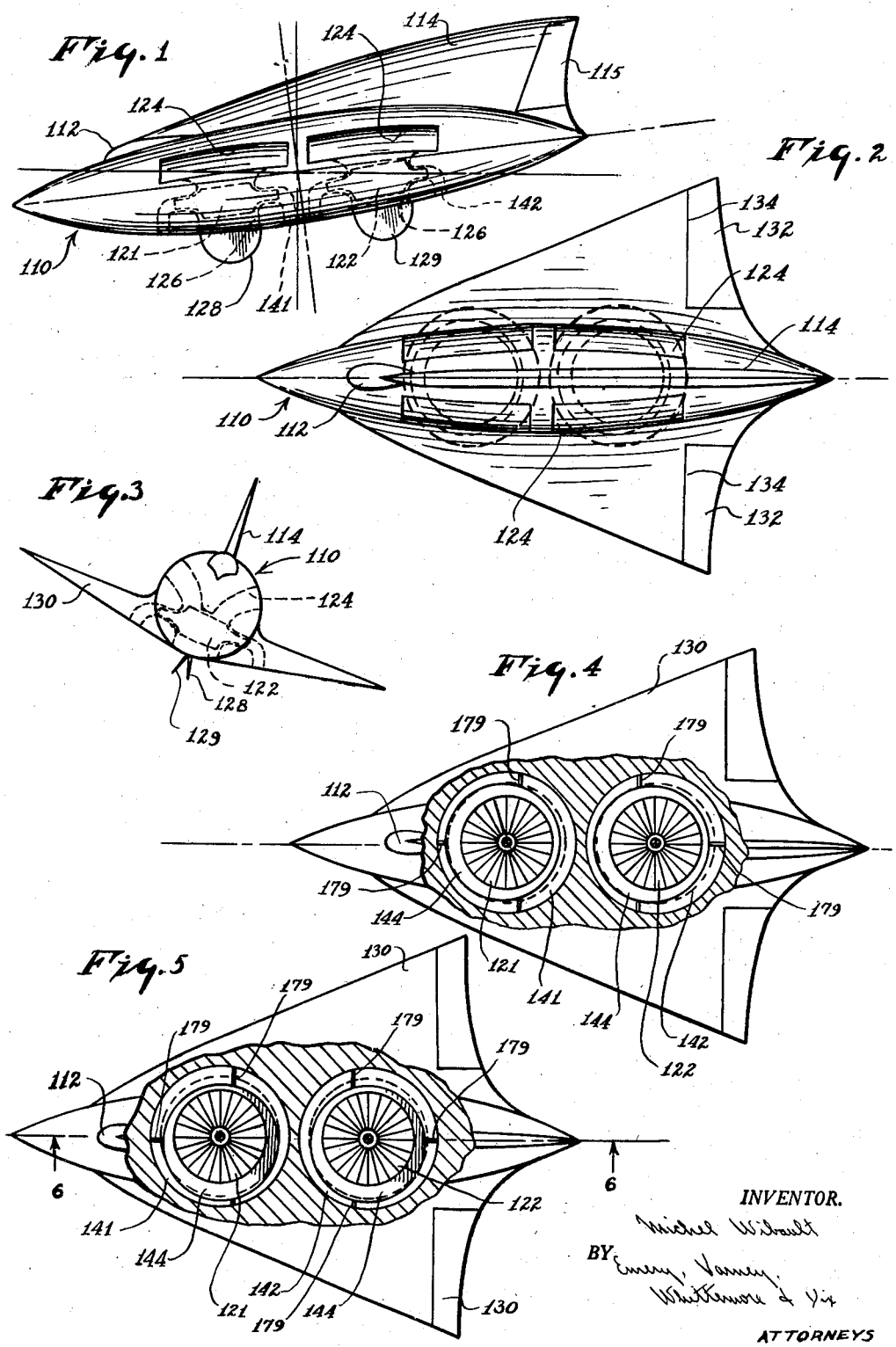
INVENTOR.
Michel Wibault
BY Emery, Varney,
Whittemore & Vix
ATTORNEYS June 10, 1958

M. WIBAULT 2,838,257

JET SUSTAINED AIRCRAFT WITH ENCLOSED
COMPRESSOR ROTOR

Filed July 27, 1954

INVENTOR.
Michel Wibault
BY Emery, Varney,
Whittemore & Dix

ATTORNEYS

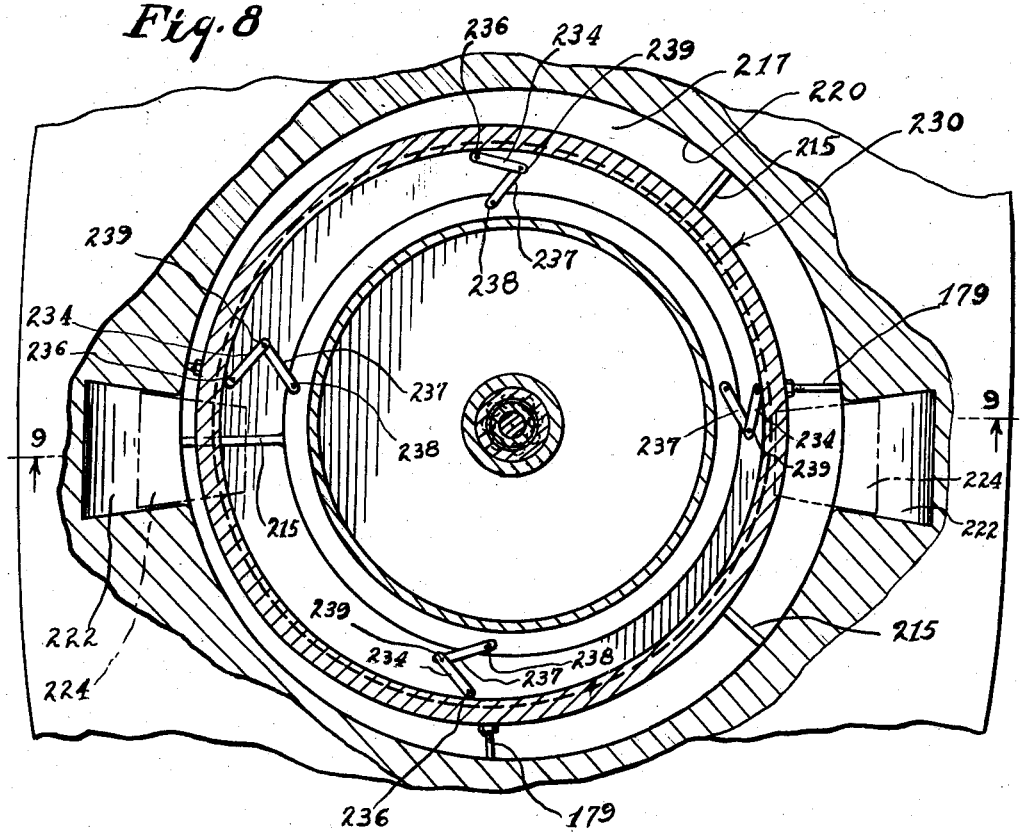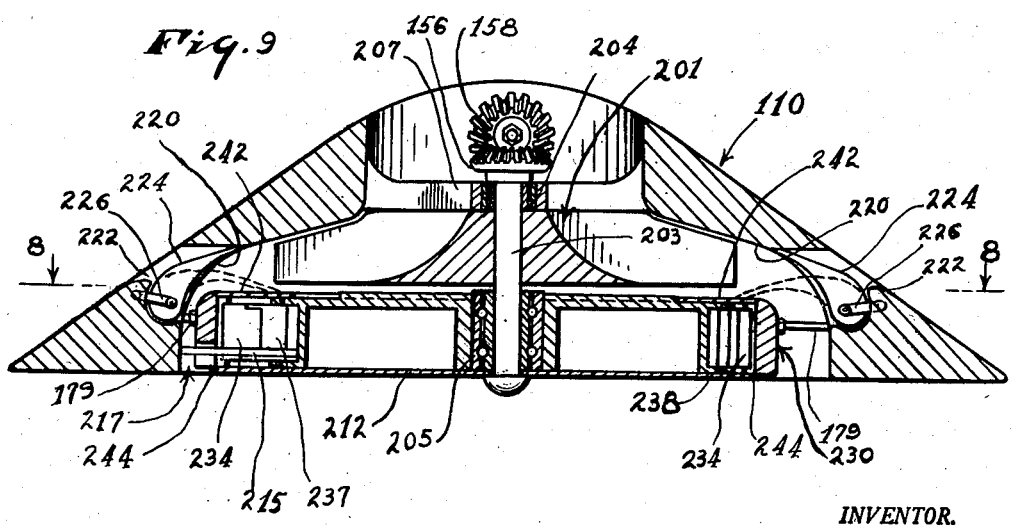

United States Patent Office 2,838,257
Patented June 10, 1958

2,838,257

JET SUSTAINED AIRCRAFT WITH ENCLOSED COMPRESSOR ROTOR

Michel Wibault, New York, N. Y., assignor to Vibrane Corporation, New York, N. Y., a corporation of New York Application July 27, 1954, Serial No. 445,974

11 Claims. (Cl. 244—23)

This invention relates to aircraft of the type having one or more enclosed centrifugal compressors which discharge streams of air against lift rings or other sustaining surfaces to develop an upward thrust. Such aircraft are provided with means for developing horizontal thrust also.

It is an object of this invention to provide an improved aircraft of the character indicated, with means for changing the air flow over the lift rings, or other thrust surfaces, so as to control the trim of the aircraft. The invention can be made to control either the longitudinal or lateral trim, and in the preferred embodiment of the invention both the lateral and longitudinal trim are regulated by control rings in the path of the air flow.

Another object of the invention is to provide special flow control devices for controlling the air flow either to or from the compressors on either side of the center line of the aircraft to affect lateral trim; and for selectively controlling the air flow of forward and rearward compressors to affect the longitudinal trim of the aircraft.

In accordance with one feature of the invention, control rings are provided in the discharge passage from the compressors and these rings can be shifted to increase or decrease the cross section of the discharge passage at any desired location around the circumference of the discharge passage. Changing the cross section of the discharge passage so as to increase it on one side and decrease it on the other causes an increase in the velocity of air flow through the portion of the passage which is of decreased diameter and a corresponding decrease in the velocity of the air flow through the portion of the discharge passage which has been increased in cross section. The increased velocity reduces the static pressure against the lift ring whereas a decrease in the velocity on the other side increases the static pressure thus producing an unbalance of the forces on the opposite side of the discharge passage.

In accordance with another feature of the invention, some of the air discharged from the compressors can be made to flow out through slots in the side of the aircraft for developing a sideways thrust which steers the aircraft and affects the trim when turning.

Another feature of the invention relates to the control of the airstream entering one or more of the compressors; this control is obtained with rudder doors located in the stream of the air approaching the compressors. The rudder doors can be swung toward one side or the other so as to partially obstruct the approaching air on one side of the compressor while increasing the flow of air to the other side. These rudder doors are operated selectively for different compressors so that the rudder doors can be swung in one direction for a forward compressor at the same time that they are swung in the other direction for a rearward compressor.

Other objects, features and advantages of the invention will appear or be pointed out as the description proceeds.

In the drawing, forming a part hereof, in which like reference characters indicate corresponding parts in all the views;

Figure 1 is a side elevation of an aircraft embodying this invention;

Figure 2 is a top plan view of the aircraft shown in Figure 1;

Figure 3 is a rear elevation of the aircraft shown in Figures 1 and 2 with the aircraft shown banking a turn;

Figure 4 is a view similar to Figure 3 but with the top portion of the aircraft broken away to show the rotors and the control rings;

Figure 5 is a view similar to Figure 4 but showing the control rings in different locations;

Figure 8 is a sectional view, taken on the line 8—8 of Figure 9, showing a modified form of the invention; and Figure 9 is a vertical section view taken on the line 9—9 of Figure 8.

Figure 6:
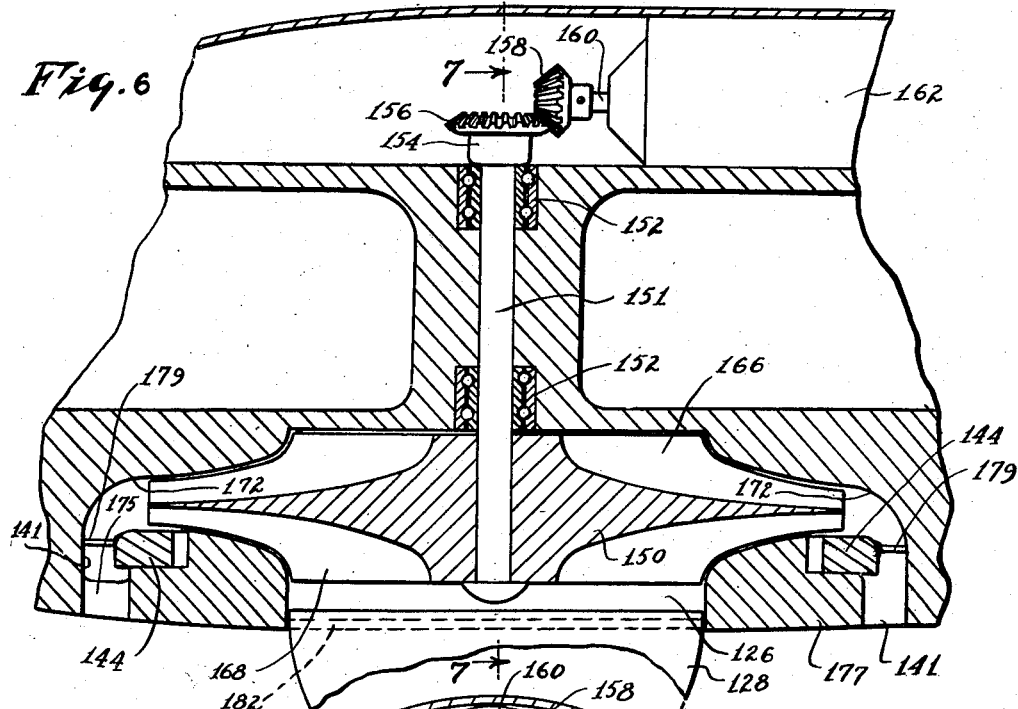
Figure 6 is a greatly enlarged sectional view taken on the line 6—6 of Figure 5.

Figure 1 shows an aircraft comprising a body 110 with a control cabin 112 near its forward end. The aircraft has a fin 114 with a rudder 115 at its rearward end. Within the body of the aircraft there are two centrifugal compressors or blowers including a forward compressor 121 and a rearward compressor 122. Each of the compressors receives air from both above and below. There are slots 124 located above the compressors 121 and 122 supplying air for the compressors from above; and there are passages 126 opening through the bottom of the aircraft body for supplying air to the compressors from below.

Under each of the inlet passages 126, there are rudder doors including doors 128 located below the forward compressor 121; and doors 129 located below the rearward compressor 122. The operation of these rudder doors 128 and 129 will be explained more fully in connection with Figure 7, and for the present it is sufficient to understand that they extend downwardly, somewhat like keels, and across the bottom inlet passages to the compressors along the longitudinal center line of the inlet passages.

The aircraft has swept-back wings 130; and each of these wings has a control surface 132 which swings about a spanwise hinge 134. The rudder 115 and the control surfaces 132 can be used for steering the aircraft and controlling the trim when the aircraft is moving forward at a substantial velocity. The control by means of the rudder 115 and the control surfaces 152 is in accordance with conventional practice. The novel control mechanism of this invention, which will be described in connection with the other figures of the drawing, can be used for controlling the trim of the aircraft while it is moving forwardly; but their principal importance is that they can be used for controlling the direction and trim of the aircraft while it is ascending or descending with substantially low horizontal headway, or insufficient headway to make the conventional rudder and control surfaces effective.

The compressor 121 discharges air through an annular outlet 141. The rearward compressor 122 discharges air through an annular outlet 142. There is a control ring 144 below the compressor 121; and this control ring 144 forms at least a part of the inside wall of the discharge outlet 141. When the control ring 144 is in a concentric position with respect to the centrifugal compressor 121, the cross section of the outlet 141 is uniform around its entire circumference.

When the control ring 144 is shifted forwardly into the position shown in full lines in Figure 4, the cross section of the outlet 141 is restricted at the front of the compressor and is increased at the back of the compressor. This increases the velocity of the air flow in front of the compressor and decreases the velocity of the air flow at the back of the compressor. As previously explained, these changes in velocity cause a reduced static pressure and corresponding reduction in lift at the front of the compressor with an increase in static pressure and lift component at the back of the compressor. This unbalancing of the force around the compressor tends to depress the nose of the aircraft and to raise the tail.

There is a corresponding control ring 144 in the outlet 142 of the rearward compressor 122. This control ring 144 for the rearward compressor 122 is movable transversely with respect to the axis of rotation of the compressor 122, in the same manner as the control ring 144 is movable with respect to the front compressor 121. In Figure 4 the control ring 144 of the rearward compressor 122 is shown shifted into a forward position, in the same manner as the front compressor so as to increase the force tending to lower the nose and raise the tail of the aircraft.

Figure 5 shows the control ring 144 of both of the compressors 121 and 122 shifted toward the port side of the aircraft so that the static pressure on the port side is reduced and that on the starboard side is increased. This uneven distribution of force causes the aircraft to tilt toward the port side; and the controls are operated to obtain such a tilt when the aircraft is turning toward the port side.

In similar manner, the control rings 144 can be shifted into any position so as to obtain maximum lift at any desired location around the circumference of either of the compressors 121 and 122 and a minimum lift on the opposite side of the compressor. The supporting means on which the control rings 144 have this transverse movement with respect to the axis of rotation of the compressors will be illustrated more fully in connection with other views of the drawing.

Figure 7:
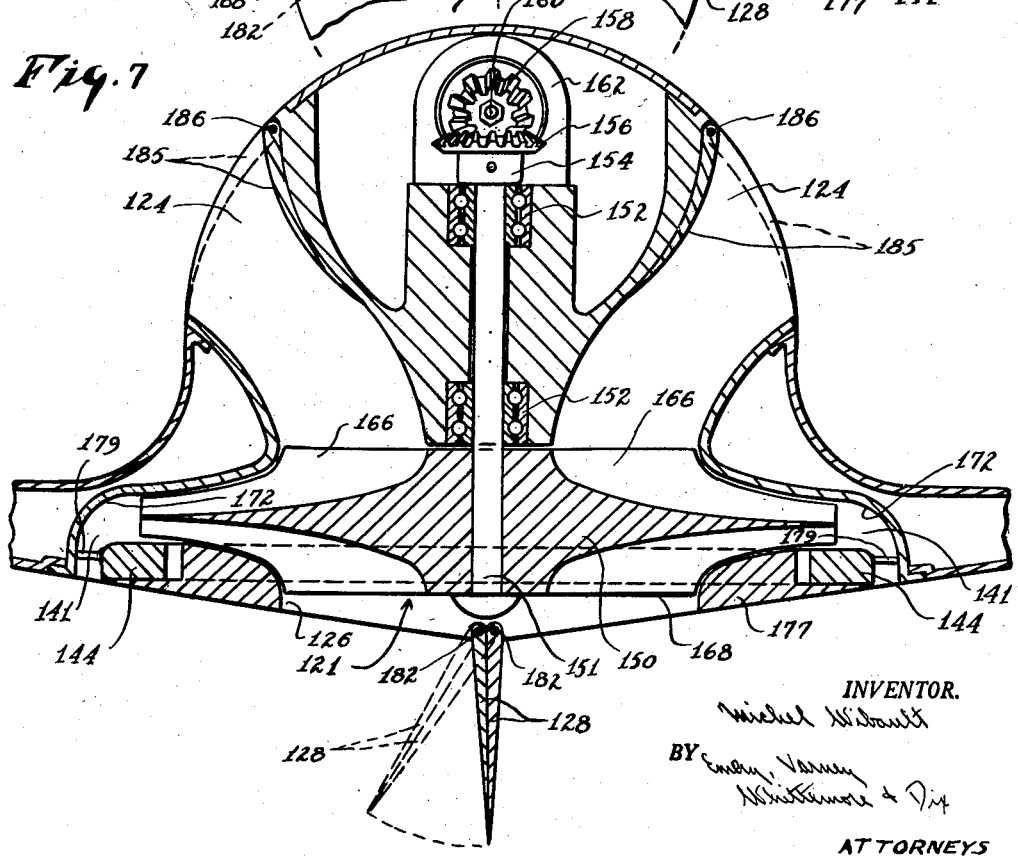
Figure 7 is an enlarged sectional view taken on the line 7—7 of Figure 6.

Figures 6 and 7 show the compressor 121 on a larger scale. It will be understood that the rearward compressor 122 is similar in construction. The compressor 121 includes a rotor having a hub portion 150 secured to the lower end of a drive shaft 151.

The drive shaft 151 extends upwardly through bearings 152 in the body of the aircraft and to a thrust bearing 153. There is a collar 154 secured to the drive shaft 151 near its upper end, and this collar 154 provides a shoulder for the shaft 151 for co-operation with the thrust bearing 153. At the upper end of the collar 154 there is a bevel gear 156 which meshes with a corresponding bevel gear 158 on a drive shaft 160 of an engine 162.

There are vanes 166 secured to the top surface of the rotor hub portion 150. Air is supplied to the inner portions of these vanes 166 through the air inlet passages 124.

There are other vanes 168 attached to the bottom surface of the hub portion 150 and air is supplied to the inner portions of the vanes 168 through the air inlet passage 126 in the bottom of the aircraft body. Both of the groups of vanes 166 and 168 discharge their airstreams into the outlet 141. The passage of the outlet 141 has a top surface 172 which changes the direction of the airstream from horizontal to substantially vertical. This deflection of the airstream produces a reaction against the surface 172 and constitutes the surface 172 a "lift ring" for the compressor 121. The vertical component of the force of the airstream against the lift ring surface 172, when combined with the corresponding vertical component of the force against the corresponding lift ring of the other compressor of the aircraft, is sufficient to produce a force which lifts the aircraft vertically even though the aircraft has no horizontal velocity.

A number of struts 175 located at angularly spaced regions around the outlet 141, support a bottom housing 177 which is annular and which comprises the wall of the inlet passage 126 and a part of the wall of the outlet 141. The control ring 144 is supported by this housing 177, and there are links 179 at a number of angularly spaced points around the control ring 144 for pulling the control ring in any desired transverse direction by combinations of pull on the various links 179. It will be understood that these links 179 connect with control apparatus operated by the pilot. The links 179 are merely representative of means for moving the control ring 144 in different directions transversely of the axis of rotation of the drive shaft 151. The control ring 144 is on the inside wall of the outlet 141, but with appropriate reversal of parts it can be made as part of the outside wall of the annular outlet passage 141.

The rudder doors 128 are supported on pivot shafts 182 extending longitudinally across the inlet passage 126. The left hand rudder door 128 can be swung clockwise, in Figure 7, into position to completely close the left hand portion of the inlet 126. In like manner, the right hand rudder door 128 can be swung counter-clockwise into position to close the right hand portion of the inlet passage 126.

When the air inlet 126 is in use, and the rudder doors 128 are to be used as control surfaces, they can be swung toward either the right or left, with both doors swinging in the same direction at the same time, to partially obstruct the flow of air into one side of the compressor 121 while at the same time producing a "funnel" effect for increasing the inflow to the other side of the compressor 121.

With the rudder doors 128 swung into the dotted line positions, shown in Figure 7, the air entering the passage 126 causes a horizontal thrust in a direction opposite to that toward which the doors are swung. This results from the fact that the stream of air entering the compressor 128 is deflected to produce a horizontal component of force on the obstructed side of the inlet. Thus the rudder doors 128 are used to turn the craft when it is not moving with enough headway to make the tail rudder effective.

There are doors 185 located in each of the inlet passages 124. These doors fold back along the inner walls of the inlet passages 124, and are shown in such positions in full lines in Figure 7. The doors 185 are connected to the body of the aircraft by hinges 186 on which the doors can swing into the dotted line positions shown in Figure 7. When in these dotted line positions, the doors 185 close the inlet passages 124.

Figures 8 and 9 show a modified form of the invention in which a single entry centrifugal compressor 201 is used in place of the compressor 121, and it will be understood that a similar single entry compressor can be used in place of the rearward compressor in the modified form of the invention illustrated in Figures 8 and 9.

The centrifugal compressor 201 is secured to a drive shaft 203 which rotates in bearings 204 and 205. The upper bearing 203 is supported by struts 207 extending across an air inlet passage that opens through the top of the aircraft body.

The lower bearing 205 is carried by a housing 212 connected to the body of the aircraft by angularly spaced struts 215 extending across a discharge outlet 217 which corresponds to the outlet 141 shown in Figures 6 and 7.

The discharge outlet 217, in Figure 9, includes a top wall 220 which deflects the air stream from the compressor downwardly to develop an upward reaction against the surface of the wall 220 so that this wall serves as a lift ring for the aircraft.

There are side outlets 222 opening through the body of the aircraft for a portion of the extent of the lift ring 220 at diametrically opposite regions around the circumference of the lift ring surface 220. These side discharge outlets 222 are closed by vanes 224 when not in use; and these vanes are shaped so that they constitute a portion of the circumference of the lift ring 220 when they are in the closed positions shown in full lines in Figure 9.

In order to discharge a portion of the air stream sideways to develop a horizontal thrust for turning the aircraft when it has little or no horizontal velocity which would make the tail rudder effective, the vanes 224 can be shifted from the full line positions to the dotted line positions, and these vanes can be shifted selectively depending upon the direction in which the pilot wishes to turn the aircraft.

Each of the vanes 224 is operated by a crank 226 connected with suitable control mechanism leading to the cabin of the aircraft. These cranks 226 are merely representative of manually actuated control mechanism for swinging the vanes 224 into open and closed positions.

The compressor 201 is driven from the engine through bevel gearing indicated by the same reference characters as the bevel gears in the other views. The control ring in Figures 8 and 9 is somewhat different from that used in the other figures and it is indicated by the reference character 230. This control ring 230 operates on the same principle as the control ring 144 described in connection with the preferred embodiment of the invention, but the control ring 230 is differently mounted.

The control ring 230 is supported from the housing 212 by four jointed arms located at angularly spaced regions around the ring. Each of these jointed arms includes a link 234 connected to the inside face of the control ring 230 by a pivot connection 236. Each of the jointed arms also includes another link 237 connected to the housing 212 by a pivot connection 238. These links 234 and 237 are connected together by a pivot connection 239 which comprises the joint of the arm.

The links 234 and 237 are of substantial vertical extent so as to provide a long pivot bearing for holding the weight of the control ring 230 without sagging of the jointed arm.

In order to prevent the space within which the jointed arms are located from ever coming open, there is a shield 242 attached to the upper end of the control ring 230 and extending inwardly over a portion of the housing 212.

There is also a shield 244 attached to the lower end of the housing 212 and extending radially outwardly under the control ring 230. The shields 242 and 244 are of sufficient radial extent so that when the control ring 230 is shifted to maximum displacement away from the housing 212, the shields 242 and 244 are long enough to cover the upper and lower ends of the chamber in which the jointed arms are supported.

There are links 179 connected to the control ring 230 at angularly spaced locations around the outside of the control ring, and these links 179 shift the control ring to any desired position in the same manner as the corresponding links 179, shown in Figures 6 and 7.

The preferred embodiment of the invention has been illustrated and described, but changes and modifications can be made and some features of the invention can be used in different combinations without departing from the invention as defined in the claims.

What is claimed is:

1. An aircraft having a body and a centrifugal blower enclosed within the body of the aircraft, an air inlet through which air is supplied to the blower, outlet passage means through which air is discharged from the blower, the downstream end of the outlet passage means discharging into the ambient atmosphere in which the aircraft flies, and different portions of said downstream end being at different locations with respect to the center of gravity of the aircraft, the outlet passage means having a wall that curves downwardly to deflect the air stream from the blower downward to develop an upward lift reaction which constitutes the curving wall a lift surface for the aircraft, and a control element located within the passage means and movable into different positions to selectively change the cross section of said different portions of the passage means so as to change the amount of air discharged from the downstream end of said passage means at different locations with respect to the center of gravity of the aircraft.

2. The aircraft described in claim 1, and in which there is a second blower enclosed within the body of the aircraft, and in which the second blower has outlet passage means with a lift surface for deflecting the air stream from the second blower downwardly, and a control element located within the outlet passage means for the second blower movable into different positions to selectively change the cross section of the outlet passage means of the second blower at different locations with respect to the center of gravity of the aircraft.

3. The aircraft described in claim 1, and in which the discharge end of the outlet passage means from the blower is located partly on the starboard side of the aircraft and partly on the port side, and in which the control element is movable transversely of the fore-and-aft center line of the aircraft to change the amount of air discharged from the outlet passage means on the different sides of the outlet and thereby control the lateral trim of the aircraft.

4. The aircraft described in claim 1, and in which there is a second blower enclosed within the body of the aircraft, and both of the blowers have outlet passage means which are located partly in front of the blower and partly behind the blower, and in which the control element for the first blower and a corresponding control element for the second blower are movable forward and aft to change the relative cross section of the outlet passage means of each blower ahead of and behind the blower to control the longitudinal trim of the aircraft.

5. An aircraft including a body, a centrifugal compressor enclosed within the body of the aircraft and rotatable about a substantially vertical shaft, an air inlet for the compressor, an air outlet from the compressor including an annular passage with a top wall that curves downwardly and that constitutes a lift ring for the aircraft, and a control ring located within the annular outlet passage and movable into different eccentric positions in the outlet passage to control the amount of air discharged to the different portions of the passage around the circumference of the passage and thereby control the static lift exerted against the lift ring by the air flow from the compressor.

6. The aircraft described in claim 5, and in which there are control surfaces extending in a fore-and-aft direction across the air inlet and extending beyond the body of the aircraft into the ambient atmosphere, and a connection between the control element and the body of the aircraft on which the control element swings from one side to the other to influence the flow of air into the different sides of the air inlet.

7. The aircraft described in claim 5, and in which there are two doors hinged to the body of the aircraft at locations extending fore-and-aft across the air inlet, the doors being of sufficient size to close the inlet when moved into positions close to the body of the aircraft and the doors being movable also into positions in which they extend away from the aircraft body and into the ambient atmosphere around the aircraft.

8. The aircraft described in claim 5, and in which there is a second compressor located within the body of the aircraft behind the first compressor, and the second compressor has an air inlet similar to that of the first compressor, and the air inlets of both the compressors open through the bottom of the aircraft body and there are two rudder doors for each of the air inlets, the doors for each inlet being hinged to the body of the aircraft along lines extending fore-and-aft across the center of the air inlet, and each of the doors being large enough to close one side of the air inlet when the door is swung into position close to the aircraft body, the doors being movable into downwardly extending positions in which they project below the body of the aircraft, and both doors of each air inlet being movable to either side of a vertical center line for influencing the flow of air into one side or the other of the inlet with which the doors are associated, the doors of the inlet of the first compressor being movable independently of the doors of inlet of the second compressor so that the doors of one inlet can be swung to one side when the doors of the other inlet are swung to the other side.

9. The aircraft described in claim 5, and in which there are two compressors located within the body of the aircraft and each of the compressors has its own lift ring, and in which the outlet of each compressor has its own control ring.

10. An aircraft including a body, a centrifugal compressor enclosed within the body of the aircraft, an air inlet for the compressor, an air outlet from the compressor including an annular passage with a top wall that curves downwardly and that constitutes a lift ring for the aircraft, other outlets from the compressor at opposite sides of the compressor and opening through the sides of the aircraft body for developing horizontal thrust to turn the aircraft, doors movable into positions to open or close said other outlets, means for selectively operating said doors, and a control ring located within the annular outlet passage and movable into different eccentric positions in the outlet passage to control the amount of air discharged to the different portions of the passage around the circumference of the passage and thereby control the static lift exerted against the lift ring by the air flow from the compressor.

11. An aircraft including a body, a centrifugal compressor enclosed within the body of the aircraft and rotatable about a substantially vertical shaft, the compressor including a rotor having a hub portion with a part that extends radially to form a flange, and vanes extending from both the upper and lower surfaces of the flange, two air inlets for the compressor, one of which supplies air to the vanes of the compressor on the bottom of the rotor and the other of which supplies air to the vanes of the compressor on top of the rotor, an air outlet from the compressor including an annular passage with a top wall that curves downwardly and that constitutes a lift ring for the aircraft, and a control ring located within the annular outlet passage and movable into different eccentric positions in the outlet passage to control the amount of air discharged to the different portions of the passage around the circumference of the passage and thereby control the static lift exerted against the lift ring by the air flow from the compressor.

References Cited in the file of this patent

UNITED STATES PATENTS

| | | |
|---|---|---|
| 1,104,542 | Porter | July 21, 1914 |
| 1,104,963 | Coanda | July 28, 1914 |
| 1,578,818 | Fitzgerald | Mar. 30, 1926 |
| 2,077,471 | Fink | Apr. 20, 1937 |